Figures 1, 2, 3, 4:
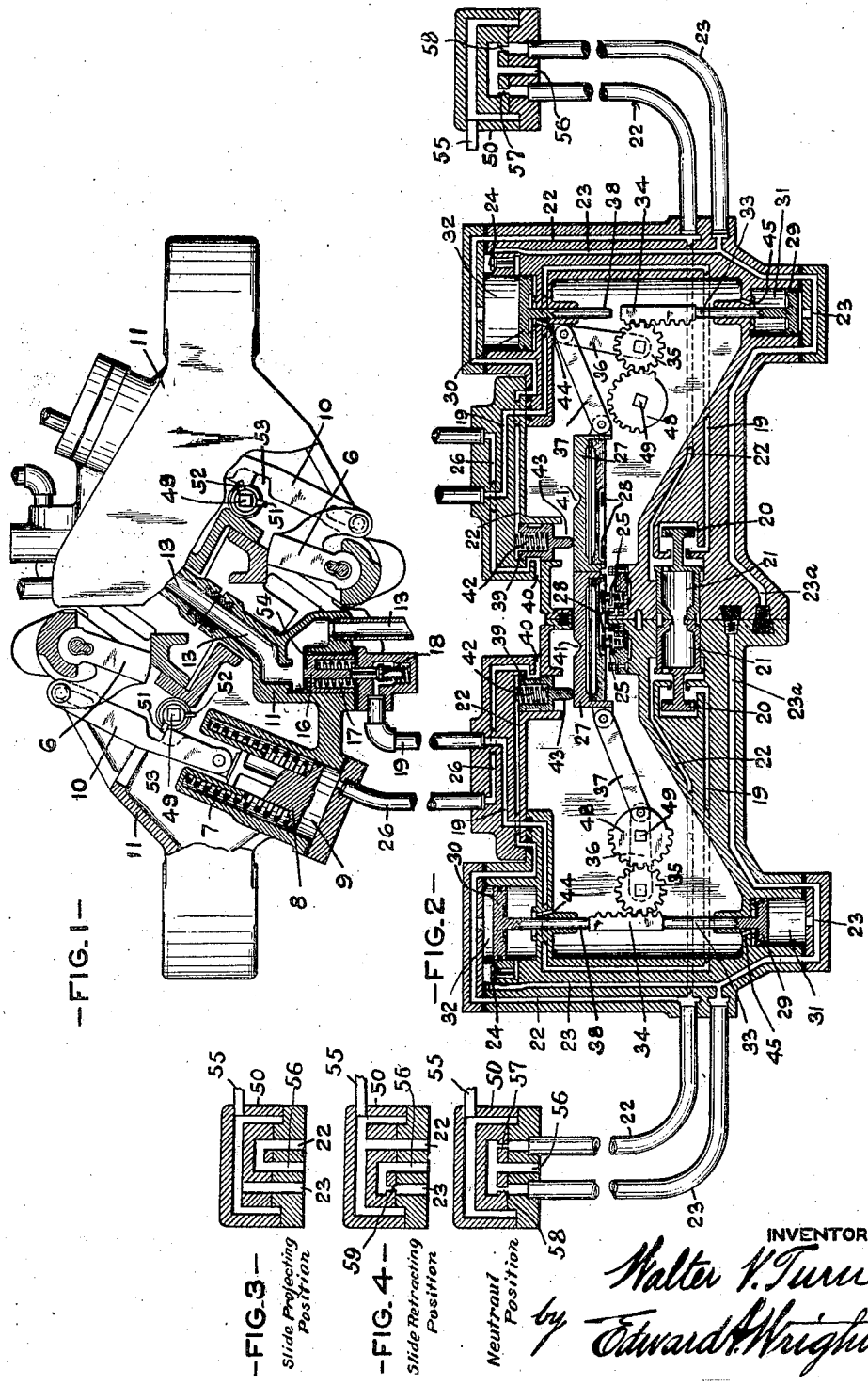

April 15, 1924.
W. V. TURNER
CAR COUPLING MECHANISM
Filed Dec. 18, 1918
1,490,147
2 Sheets-Sheet 1

Slide Projecting Position

Slide Retracting Position

Neutral Position

INVENTOR
Walter V. Turner
by Edward F. Wright
Atty

April 15, 1924.
W. V. TURNER
1,490,147
CAR COUPLING MECHANISM
Filed Dec. 18, 1918  2 Sheets-Sheet 2
—FIG.5—
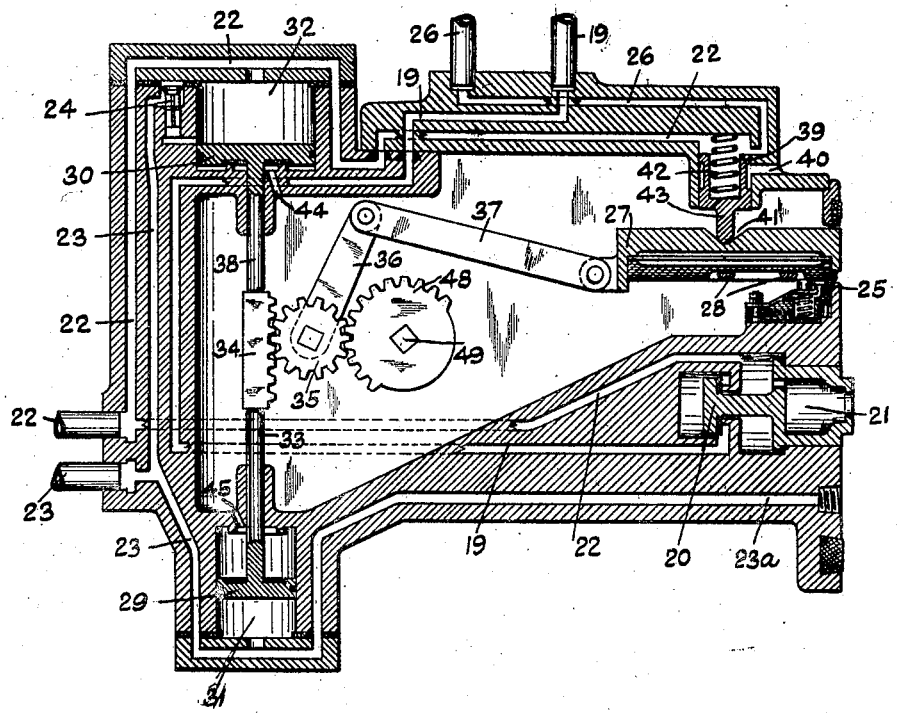
INVENTOR
Walter V. Turner.
by Edward H. Wright Atty.

Patented Apr. 15, 1924.

1,490,147

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR-COUPLING MECHANISM.

Application filed December 18, 1918. Serial No. 267,264.

*To all whom it may concern:*

Be it known that I, WALTER V. TURNER, a citizen of the United States, and resident of Wilkinsburg, in the county of Allegheny and State of Pennsylvania, have invented a certain new and useful Improvement in Car-Coupling Mechanism, of which improvement the following is a specification.

This invention relates to coupling mechanism for cars, in which there are also provided means for making train pipe connections and for coupling the electric train line circuits between the cars. Heretofore, there have been various forms of coupling devices designed for this purpose and in which each coupler is formed of a head portion having a movable lock for engaging a counter part coupler head and also provided with one or more passages having gasket openings for connecting with the corresponding openings in the other coupler, and an electric portion, usually secured to the bottom of the coupler head, and containing a plurality of electric contacts and a movable slide or carrier having suitable contacts and adapted to be projected into the casing of a counterpart coupler for establishing electrical connection between the corresponding contacts and circuits of the respective cars. Means operated by fluid pressure have also been employed for releasing the coupler locks, for operating valves in the train pipe conduits, and for projecting and withdrawing the contact carrier.

My invention has for its object to provide an improved coupling mechanism of this character and in which the contact carrier is adapted to be projected and withdrawn by fluid pressure operated means, controlled by a manually operated valve at the end of the car, and the train pipe conduits are also opened and closed by pressure operated valve controlled by the same manually operated valves.

In the accompanying drawings: Figure 1 is a view partly in plan and partly in horizontal section of a pair of coupler heads coupled togther; Fig. 2 a diagrammatic section of the electric portion of the coupler which is usually mounted in a casing attached to the under side of the coupler head, this view showing the electric portions of two counterpart couplers together with the contact carrier of one projected into the other to establish the electrical connections; Figs. 3 and 4, diagrammatic sections of a manually operated valve in different positions; and Fig. 5, a diagrammatic section of the electric portion of one coupler, and showing the parts in the retracted or normal position of the contact carrier when the couplers are separated.

According to the construction shown, my improvement is applied in connection with a coupler of the rigid lock type, that is, one in which the counter part couplers are each provided with projecting portions having vertical plane surfaces arranged in an inclined or diagonal direction, whereby the couplers engage each other with a relative longitudinal and lateral movement during the coupling action, and each coupler also having a pivoted lock or cam lever adapted to be automatically clamped against a corresponding surface on the counterpart coupler.

These locking levers, 6, are normally pressed outward by the springs, 7, acting on the pistons, 8, mounted in cylinders, 9, and connected by rods, 10, with the pivoted locks for releasing the same with fluid pressure admitted to said cylinders.

In the body portion 11 of the coupler head may be located the passages for the fluid pressure conduits, such as the train brake pipe 13, the passages being provided with suitable gaskets at the meeting faces of the couplers. Communication through the train pipe passage is controlled by the piston valve 16, having a spring 17, for closing the valve and holding the same closed against its seat when the pressure in the chamber back of the piston is substantially equalized with that of the train pipe. A restricted groove 54, or a loose fit of the piston valve 16, in its cylindrical chamber provides for a gradual flow of fluid from the train pipe around said piston to the space back of the same, from which space a pipe or passage 19 communicates with the valve 20 at the face of the coupler, said valve having a hollow tappet 21 adapted to engage the corresponding tappet valve of the counterpart coupler when the two couplers are brought together, as shown in Fig. 2. The valve 20 also controls communication between the passages 19 and 22.

The electric portion of the coupler, which may be mounted in a casing secured to the bottom of the coupler head, comprises a plurality of electric contacts 25, connected to the respective circuits, and a contact carrier or slide 27, having contacts 28, adapted to establish electric connection between the corresponding circuits of the adjoining cars when coupled together with the slide projected into the counterpart coupler. For operating the carrier or slide, both for projecting and for retracting or withdrawing the same, there is provided the differential pistons 29, and 30, located in the respective chambers 31 and 32, the latter being the larger in area but having a shorter stroke than the former. The smaller piston 29 has a stem 33 connected to the rack 34, which meshes with pinion 35, the shaft of which has a crank arm 36, and a connecting rod 37, for actuating the slide 27. The stem 38 of piston 30 also engages the rack 34. Pipe and passage 22 communicates with the outer end of cylinder 32, while pipe and passage 23 communicates with cylinder 31. A valve 39, actuated by a spring 42, and the slide 27, controls communication from passage 22 to passage and pipe 26 leading to the unlocking cylinder 9, and from said passage 26 to the atmosphere through port 40.

The hand-operated valve 50, which may be located in the cab at the end of the car, is connected to the pipes 22 and 23, and contains suitable ports for supplying compressed air or other fluid from a reservoir, or other source, to either pipe, and also to exhaust either or both pipes to the atmosphere.

When the couplers are separated the parts assume the positions shown in Fig. 5; the slide 27 is withdrawn within the casing with the stem 43 of valve 39 engaging the recess 41 by means of spring 42, and the valve closing exhaust port 40 and opening communication between passages 22 and 26. The tappet valve 20 is also closed upon its seat, cutting off communication from passage 19 to passage 22, but opening an exhaust from passage 22 through the hollow tappet 21 to the atmosphere. If the train pipe 13 is charged with fluid under pressure, the same is equalized around the piston valve 16 and into the passage 19, and the spring 17 holds the valve closed. The hand operated valve 50 occupies its neutral position, indicated in Fig. 2, in which there are restricted exhaust ports, 57 and 58, from both pipes 22 and 23 to exhaust passage, 56, and the atmosphere.

When two cars are brought together in the act of coupling, the coupler heads become mechanically interlocked automatically in the usual way by the action of the locking levers 6 and springs 7. The abutting hollow tappets 21 also engage each other and force the valves 20 away from their seats, thus opening communication from passage 19 to passage 22 and the exhaust port 56, of the hand valve 50. This relieves the pressure from the back of the piston valve 16, whereupon the pressure of the train pipe, acting on the face of the valve forces the same back against the spring 17, to its open position, as indicated in Fig. 1. The piston 16 engages the small valve 18 in the passage at the rear of the chamber and holds the same open. Fluid is then free to flow through the train pipe passages from one coupler to the other.

In order to effect the electric connection between the couplers one of the manual valves 50 is moved to its slide projecting position, indicated in Fig. 3, in which fluid flows from the supply 55, into the pipe and passage 23, while the pipe 22 is open to the exhaust 56. Pressure from passage 23 enters cylinder 31, and forces the piston 29 to the upper end of the cylinder, the stem 33 actuating the rack 34, pinion 35 and toggle arms 36 and 37 to project the contact carrier or slide 27 through the openings and into the abutting coupler to establish electrical connection between the respective contacts 25 in both couplers. As the slide is extended, it engages and forces back the slide in the adjoining coupler, all as shown in Fig. 2. This movement of the slides operate the stems 43 of the valves 39 to raise said valves and cut off communication between passages 22 and 26 and open the latter to the exhaust 40 to the atmosphere. The cylinder 32 of the larger piston 30, is at this time open to the exhaust through hand valve 50. This valve is then returned to its normal neutral position, shown in Fig. 2, in which both cylinders 30 and 31 are connected through the respective restricted ports, 57 and 58, to the exhaust port 56, of valve 50. As the stroke of the large piston 30 is shorter than that of piston 29, the rack 34 may be moved away from contact with its stem 38 when the slide 27 of the adjoining coupler is pushed back to its inner position, as indicated in Fig. 2.

When it is desired to uncouple the cars it is necessary to first withdraw the slide 27, and this is done by turning the hand valve 50 to the slide retracting position indicated in Fig. 4, in which fluid under pressure from the source of supply flows through pipe and passage 22, to the cylinder 32 at the outer face of the large piston 30, moving the same and stem 38 against the rack 34 to turn the pinion and withdraw the slide to the position shown in Fig. 5. In this position of the valve 50, the passage and pipe 23 is connected through a restricted port 59, to the exhaust 56. Fluid from passage 22 also flows by the valve 20 to passage 19, and through hollow tappet 21 to passage 19 of the other coupler, and to the back of the both train pipe valves 16, equalizing the pressure thereon so that the springs 17 automatically close said valves. The small valves 18 then also close and prevent overcharging of the train pipe by a further flow of fluid past the pistons 16. As the slide 27, of the coupler of the car on which the hand valve 50 is operated, is withdrawn, the stem of valve 39 engages the recess 41, and the valve then closes exhaust port 40 and opens communication from passage 22 to passage and pipe 26, thereby allowing fluid to flow into the unlocking cylinder 9 of piston 8 and release the latch 6 of that coupler. As the piston 30 of each coupler reaches its innermost position fluid from chamber 32 passes through check valve 24 and passage 23 to the cylinder 31 of smaller piston 29. In one coupler this has no effect as the rack bears against the piston stem and the pressure on the larger head 30 of the differential piston mechanism holds the parts from moving. In the other coupler, however, in which the rack has moved away from the piston stem 38, as shown in Fig. 2, the pressure acting on the smaller piston returns the rack and slide to the normal position indicated in Fig. 5. When this slide reaches its normal position the corresponding valve 39 opens a supply of fluid to the unlocking cylinder of that coupler and the latch is released. During this operation the passage, 23, of the coupler of the car on which the valve 50 is shifted to the slide retracting position, (Fig. 4), is connected to the exhaust, 56, through the restricted port, 59, while in the other coupler, the passages, 22 and 23, are connected to the exhaust, 56, through the respective restricted ports, 57 and 58, and there will be a slight leakage of compressed air to the atmosphere at these points, but the restricted ports are of such small capacity, that the loss of air will not be material, and it will not be sufficient to affect the accumulation of the desired pressure upon the operating pistons of the coupler for actuating the same.

The hand valve 50 is then returned to neutral position. The cars may then be pulled apart and the couplers separated.

The supply of fluid from one coupler to the other for releasing purposes is through the passages 22 and the hollow tappets 21, so that this releasing action may be effected by operating the hand valve 50 upon either car. When the cars are separated the valves 20 close automatically by the pressure acting thereon so that the pressure is maintained on the back of the train pipe valve 16 and the same remains closed. The pressure from the unlocking cylinders 9 is released to the atmosphere either through passage 22 and hollow tappets 21, when the couplers are separated or through the restricted port, 58, and exhaust port 56, in hand valve 50, after the same has been restored to neutral position.

In order to prevent the possibility of extending the slide by turning the hand valve to the "slide projecting" position when the couplers are separated, the passage 23 has a branch passage 23ª, opening through the face of the coupler but adapted to be closed by the other coupler when the couplers are brought together. Should the hand valve be turned to this position when the couplers are separated, the free flow of fluid to the atmosphere through passage 23ª, would be sufficient to prevent the accumulation of pressure to operate the piston 29. If, however, it be desired to test the operation of the device at any time when couplers are separated, a temporary plug may be inserted into the open end of passage 23ª, for closing same. Ports 44 and 45 are provided to prevent trapping of fluid behind pistons 30 and 29, but these ports are sealed by the seating of the pistons on their gaskets when in the outer extreme position. Check valve 24 prevents fluid from passage 23 flowing to the space back of piston 30 and to the atmosphere through vent port 44.

For the purpose of operating the slide manually without the use of fluid pressure, there may be provided a segmental pinion 48 meshing with pinion 35, and having a shaft 49 extending outside of the casing and adapted to be turned by a wrench. The shaft 49, may also extend into close proximity with the latch rod 10, and be provided with interlocking means, such as stop projections or lugs 51 and 52, adapted to cooperate with slots 53 in the rod, so that the slide may be manually operated when the couplers are coupled together but cannot be so operated when the couplers are separated.

It will now be seen that my improvement embodies the following advantageous features: That the movement of the contact slides in both directions is by means of fluid pressure, thereby eliminating entirely the use of springs for the purpose of withdrawing or returning the slides to normal position, and obtaining a certain and positive action at all times; that the contact slides of both couplers are moved during the coupling operation, that is, the slide that is projected is adapted to engage and push back the slide of the other coupler to its innermost position from which it is returned to normal position by fluid pressure in the uncoupling operation; that as a result of this arrangement both slides may be used to control independently, a supply of fluid to the unlocking cylinder of its respective coupler whereby the coupling cannot be fully released and uncoupled until both slides have been returned to normal position; that by the use of differential pistons having different lengths of travel, one piston may have an independent movement relative to the other to provide for the extreme inward movement of the slide and its return to normal position; that the train pipe valves may be operated to close by the same supply of fluid from the hand valve as is used for operating the differential piston mechanism to return the contact slides to their normal positions; that the contact slides may be manually operated without fluid pressure, but only when the couplers are coupled together; and that it is not necessary to hold fluid pressure acting upon the differential piston mechanism after the slides have been shifted to either the connected position or to the normal release position but said fluid pressure may be released or exhausted to the atmosphere and the parts remain in their same positions.

Having now described my invention what I claim as new and desire to secure by Letters Patent is:

1. In a coupling, the combination of a pair of counterpart couplers, each comprising a casing containing electric contacts connected to the respective train line circuits, movable contact carriers, pistons for projecting either carrier into the counterpart coupler to push back the carrier therein and establish electrical connections with the corresponding circuits, and other fluid pressure operated pistons for withdrawing said projected carrier and for returning the other carrier to its normal position.

2. In a coupling, the combination of a pair of counterpart couplers, each comprising a casing containing electric contacts connected to the respective train line circuits, movable contact carriers, pistons for projecting either carrier to one position into the counterpart coupler to push back the carrier therein to a second position and establish electrical connections with the corresponding circuits, and other pistons of larger area for withdrawing either carrier to a third position.

3. In a coupling, the combination of a pair of counterpart couplers, each comprising a casing containing electric contacts connected to the respective train line circuits, movable contact carriers, pistons for projecting either carrier into the counterpart coupler to push back the carrier therein and establish electrical connections with the corresponding circuits, and other pistons having movements independent of said first mentioned pistons for withdrawing either carrier.

4. In a coupling, the combination of a pair of counterpart couplers, each comprising a casing containing electric contacts connected to the respective train line circuits, movable contact carriers, pistons for projecting either carrier into the counterpart coupler to push back the carrier therein and establish electrical connections with the corresponding circuits, and other pistons of larger area and having movements independent of said first mentioned pistons for withdrawing either carrier and for returning the other carrier to its normal position.

5. In a coupling, the combination of a pair of counterpart couplers, each comprising a casing containing electric contacts connected to the respective train line circuits, movable contact carriers, rack and pinion mechanism for operating said carriers, a piston connected to the rack of each coupler for projecting either carrier, and another piston of larger area on each coupler for moving said racks in the opposite direction.

6. In a coupling, the combination of a pair of counterpart couplers, each comprising a casing containing electric contacts connected to the respective train line circuits, movable contact carriers, pistons for projecting either carrier into the counterpart coupler to push back the carrier therein and establish electrical connections with the corresponding circuits, other pistons for withdrawing either carrier, and a manually operated valve for each coupler for supplying fluid to the pistons of both couplers.

7. In a coupler, the combination of a casing containing electric contacts connected to the respective train line circuits, a movable contact carrier adapted to be projected into a counterpart coupler to push back the contact carrier therein and establish electrical connections with the corresponding circuits, fluid pressure means for projecting and retracting one carrier, and means actuated by fluid pressure for returning the other carrier from its inner position to its normal position.

8. In a coupler, the combination of a casing containing electric contacts connected to the respective train line circuits, a movable contact carrier adapted to be projected into a counterpart coupler to push back the contact carrier therein and establish electrical connections with the corresponding circuits, and independent differential area pistons for operating said carrier and for returning the other carrier from its innermost position to its normal position.

9. In a coupler, the combination of a casing containing electric contacts connected to the respective train line circuits, a movable contact carrier adapted to be projected into a counterpart coupler to push back the contact carrier therein and establish electrical connections with the corresponding circuits, differential area pistons for projecting and retracting said carrier and for returning the carrier of the other coupler to its normal position, and a manually operated valve for controlling the supply of fluid to said pistons of both couplers.

10. In a coupler, the combination of a casing containing electric contacts connected to the respective train line circuits, a movable contact carrier adapted to be projected into a counterpart coupler to push back the contact carrier therein and establish electrical connections with the corresponding circuits, opposing differential area pistons for operating said carrier, the smaller piston having a longer stroke than the larger piston and an independent movement through a part of its stroke.

11. In a coupler, the combination of a casing containing electric contacts connected to the respective train circuits, a movable contact carrier adapted to be projected into a counterpart coupler to push back the contact carrier therein and establish electrical connections with the corresponding circuits, opposing differential area pistons for operating said carrier, and a manually operated valve for controlling a supply of fluid to the smaller piston for projecting the carrier and to the larger piston for withdrawing said carrier.

12. In a coupler, the combination of a casing containing electric contacts connected to the respective train line circuits, a movable contact carrier adapted to be projected into a counterpart coupler to push back the contact carrier therein and establish electrical connections with the corresponding circuits, differential area pistons for operating the carriers, one having an independent movement relative to the other, and means for supplying fluid to the larger piston to withdraw the projected carrier, and to the smaller piston of the other coupler to return its contact carrier to its normal position.

In testimony whereof I have hereunto set my hand.

WALTER V. TURNER.